INVENTOR: ROBERT E. TRUFFAUT
ATTORNEY: Paul H. Smolka

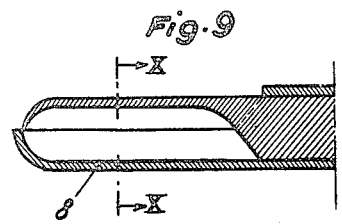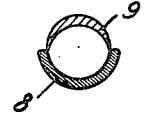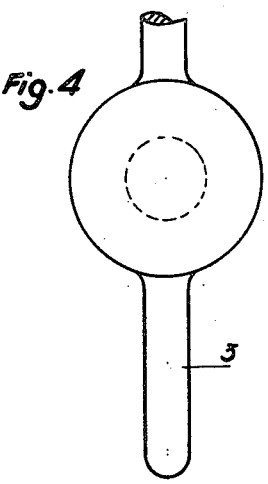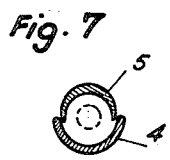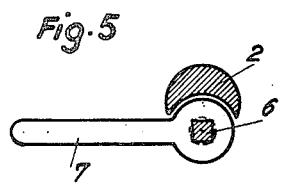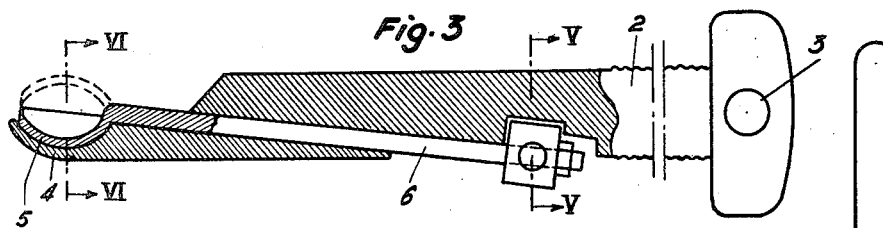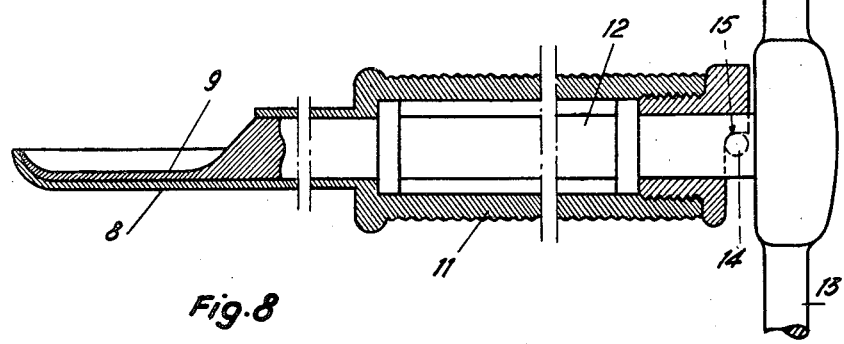

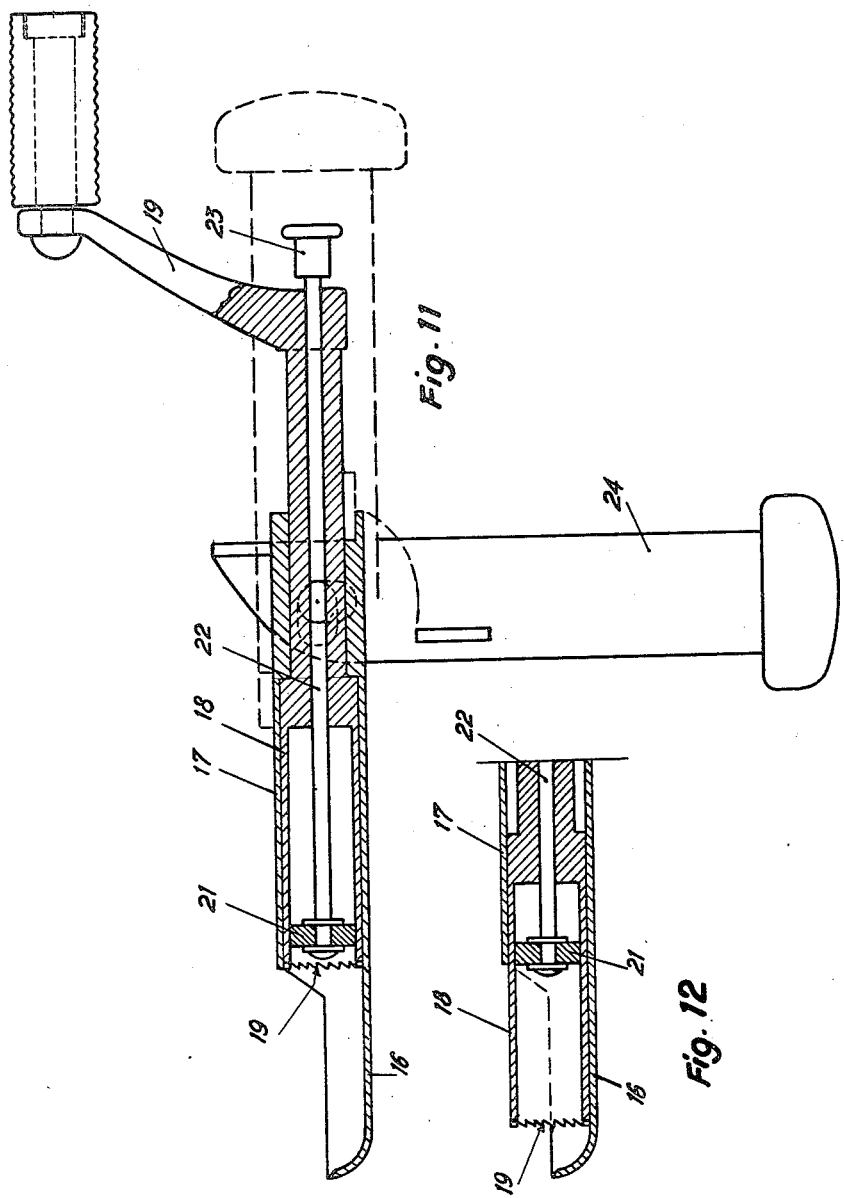

Oct. 5, 1954

R. E. TRUFFAUT 2,690,587

MEANS FOR EXTRACTING HYPOPHYSES FROM
HEADS OF KILLED ANIMALS

Filed Oct. 28, 1952

INVENTOR: ROBERT E. TRUFFAUT
ATTORNEY: Paul H. Gnolka

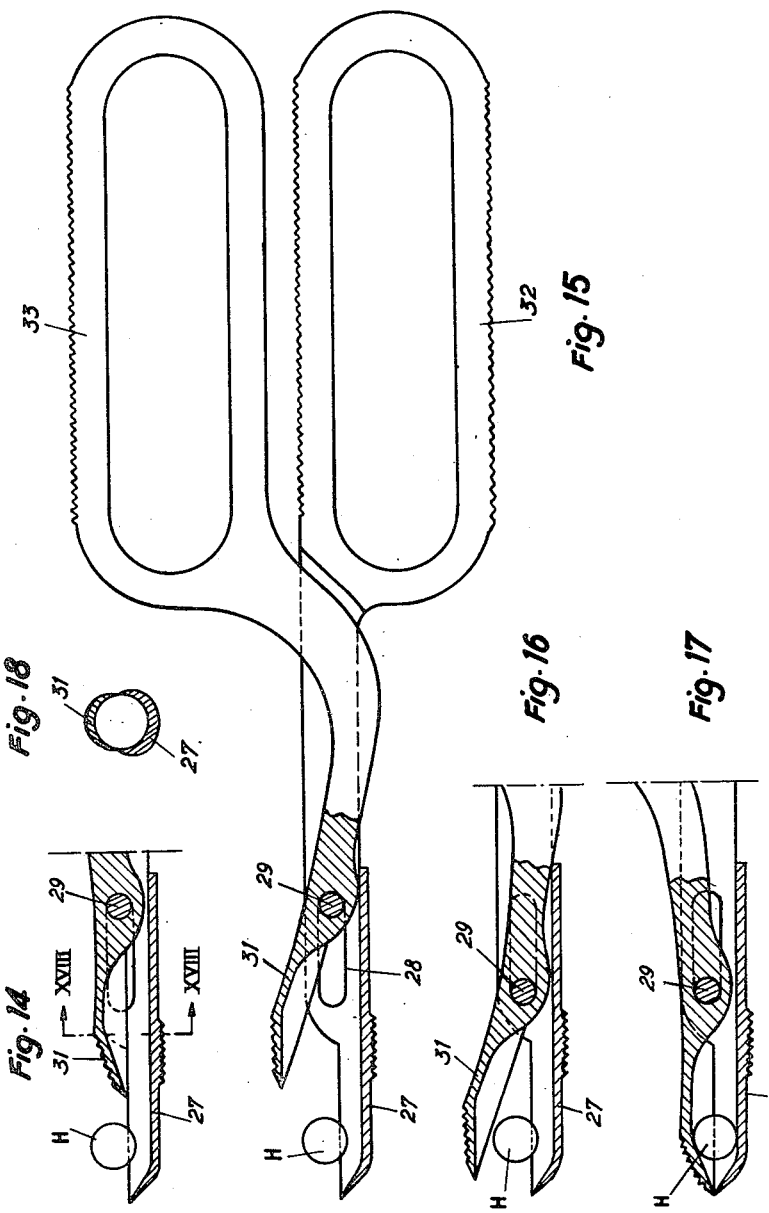

Patented Oct. 5, 1954

2,690,587

UNITED STATES PATENT OFFICE 2,690,587

MEANS FOR EXTRACTING HYPOPHYSES FROM HEADS OF KILLED ANIMALS

Robert Ernest Truffaut, Meulan, France

Application October 28, 1952, Serial No. 317,248

Claims priority, application France November 12, 1951

1 Claim. (Cl. 17—1)

My invention relates to a means for extracting hypophyses from heads of killed animals. It has already been suggested to extract the hypophysis from the detached head of a killed animal by means of an instrument introduced through the occipital hole. This method can not be applied if the hypophysis is to be extracted from the undetached head of a killed animal because a gash made to reach the occipital hole in the head would result in decreasing the market value of the head.

The object of my invention is to make possible the extraction of the hypophysis from the undetached head of a killed animal without leaving any visible traces of the performed operation. To this effect I use according to my invention a particularly constructed instrument which is brought into operative position by trans-orbital approach that is by introducing the same between the eye and its orbit.

Indeed, the orbit has the form of a pear whose tail (foramen opticum), directed toward the interior of the head, is pierced and opens slightly below the hypophysis which is supported by a small cartilage diaphragm.

When the extracting instrument passes, the eye is merely pushed aside, without being damaged, and it takes up its initial position under its lid which closes again when the instrument is removed.

The small inner hollow resulting from the extraction of the hypophysis is therefore out of contact with the surrounding air, thereby avoiding an alteration of the brain. No passage is left into which flies would come to lay their eggs.

It is clear that this method, though primarily suggested for operation on whole animals, is also applicable for operation on heads cut off.

Moreover, the method makes it possible to reduce the time between the death of the animal and the extraction of the hypophysis, and to operate, if so desired, even before a beginning of treatment of the animal, immediately after bleeding.

As the small rear hole of the orbit is insufficient to pass the extracting tool, the method according to the present invention comprises enlarging this hole, preferably by means of the extracting instrument itself acting as a lever having for its fulcrum the lower edge of said hole.

Another object of my invention is to provide an instrument suitable for extracting the hypophyse according to the aforesaid method. Each such instrument is provided on its rounded end with a spoon or pickup and with a substantially semi-cylindric cavity suitable for picking up the hypophyse. Such tool is forcibly introduced into the foramen opticum so as to enlarge the same.

Several embodiments of the invention will now be described by way of example with reference to the accompanying drawing in which.

Figure 13:
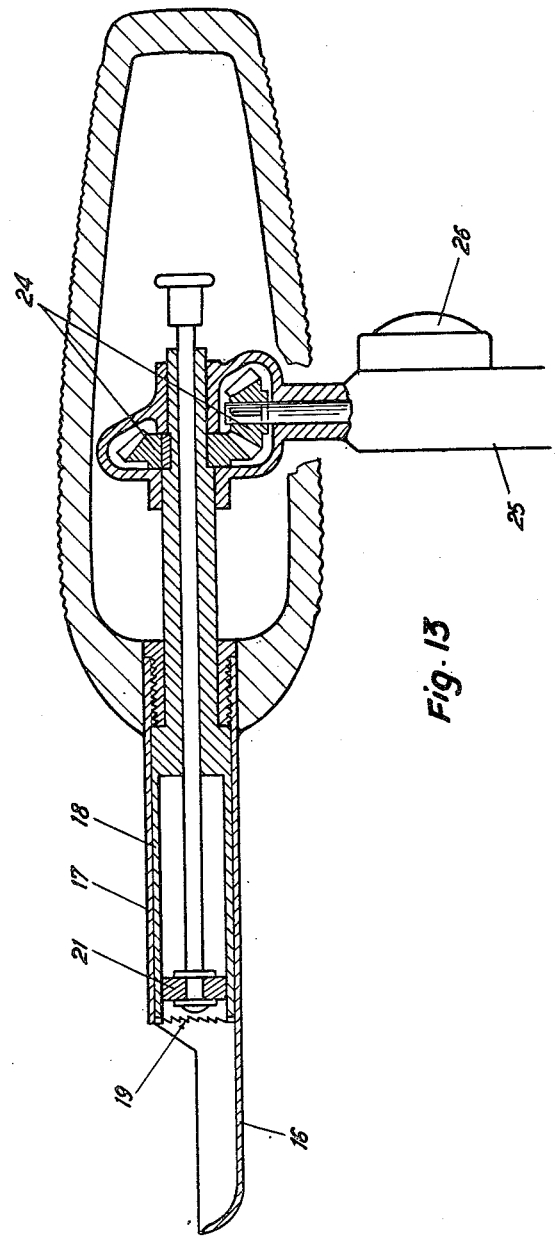

Figs. 3 to 7, inclusive, relate to one form of extracting tool; Fig. 3 being an axial elevational section; Fig. 4, an end view of the operating handle; Fig. 5, a sectional elevational view taken along the line V—V of Fig. 3; Figs. 6 and 7, sectional views taken along the line VI—VI of Fig. 3 and showing two positions of the inner spoon;

Figs. 8 to 10, inclusive, relate to a further form of extracting tool; Fig. 8 being an axial elevational section of the tool assembly; Fig. 9, an analogous view in which the lower spoon takes another position; and Fig. 10, a section along the line X—X of Fig. 9;

Figs. 11 and 12 relate to yet a further form of extracting tool; Fig. 11 being an axial elevational section of the tool assembly; and Fig. 12, an analogous view of the tool end, with parts in different positions;

Fig. 13 is an axial elevational section of a further form of extracting tool; and Figs. 14 to 18, inclusive, are concerned with still another form of extracting tool; Figs. 14 to 17 showing in section the end of the tool whose parts take different successive positions, whereas Fig. 18 is a cross section along the line XVIII—XVIII of Fig. 14.

Figure 1:
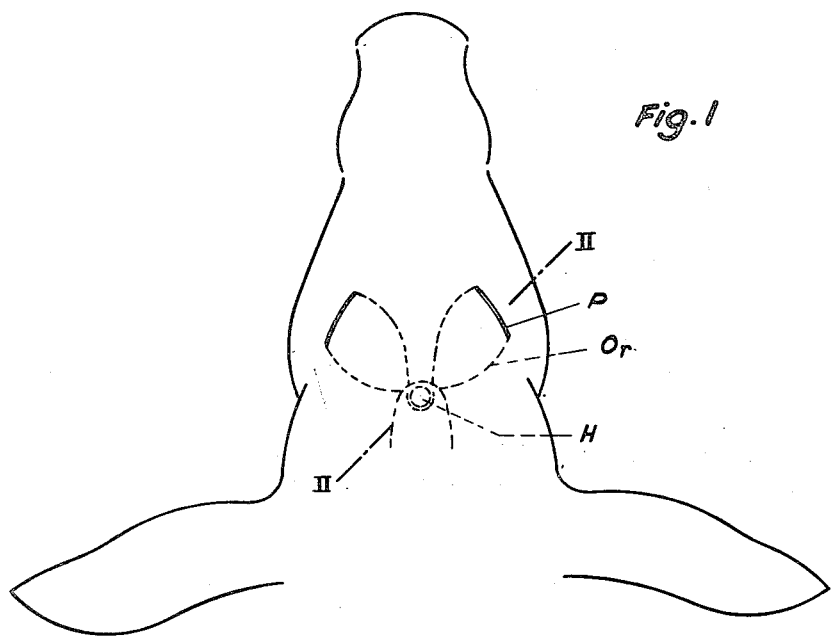
Fig. 1 is a frontal view of a pig head, showing the position of the hypophyse and that of the orbit.
Figure 2:
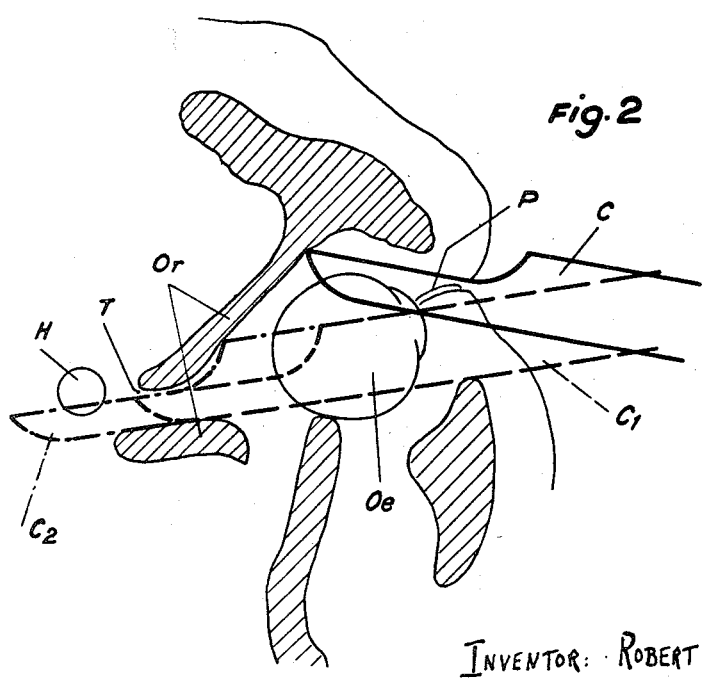
Fig. 2 is a sectional view taken along the line II—II of Fig. 1.

Schematically shown in Figs. 1 and 2 is the orbit Or with its posterior hole T. This orbit contains the eye Oe protected by the lids P which here are shown as being closed. The hypophysis, which rests on a cartilage and is connected with neighboring elements by ligaments, is denoted by reference H.

A tool schematically denoted by reference C (Fig. 2) is introduced, between the closed lids P, without damaging the eye. The end of this tool is directed along the upper wall of the orbit toward the hole T (position $C_1$, which is effected without any difficulty. The tool end is then pushed into its position $C_2$ underneath the hypophyse H, eventually after enlargement of the hole T.

In Figs. 3 to 7, inclusive, the principal body 2 of extracting tool, preferably semi-cylindric, is provided at one end with an operating handle 3 and at the other end with a spoon 4. A second or inner spoon 5, with sharp edges, is placed into the spoon 4 and is mounted on the end of a shaft 6 extended outwards and controlled by means of a handle 7. The axis of this shaft and the axis of body 2 may form an angle as shown in Fig. 3.

Upon rotating the inner spoon 5 through a half revolution, from its position in Fig. 6 to its position in Fig. 7, the support and ligaments of the hypophysis are severed and the same is confined in a closed space between the spoons 4 and 5. The tool is then withdrawn after its assembly has been rotated through a half-revolution, its solid semi-cylindric portion enlarging the hole T to make way for the opposed spoons 4, 5 containing the gland.

The tool shown in Figs. 8, 9, 10 permits of simultaneously picking up the gland and enlarging the hole.

This tool is composed of two spoons 8, 9 sufficiently long to reach the gland at the same time as the bone to be severed, and which are mounted concentrically with abutments adapted to adjust their relative positions lengthwise. The outer spoon 8 extends from the end of a tubular handle 11, whereas the inner spoon 9, with sharp edges, terminates a very strong shaft 12 actuated by the rotation of a handle 13 formed by a transversal rod. A snag 14, mounted on the central shaft 12, and abutments 15, managed on the tubular handle 11, limit the rotation of the shaft in both directions.

The tools shown in Figs. 3 to 10, inclusive, are designed to be easily demountable with a view to sharpening the spoons.

The tools shown in Figs. 11, 12, 13 and controlled either manually or by a small motor, permit of enlarging the hole before reaching the gland.

These tools have only one spoon 16 which is semi-cylindric and is mounted on the end of a tube 17 in which is displaced a boring bit formed by a cylinder 18 whose end section is provided with saw-like teeth 19 suitable for severing the bone, whereas the cylinder 18 may encompass the gland. The boring cylinder 18 may receive (Fig. 11) an advancing motion in the tube 17 and a rotary motion in this tube, when the handle 19 is actuated. On the other hand, within the boring cylinder 18 may be displaced a suction piston 21 mounted at the end of a rod 22 provided with a control button 23. To facilitate the operation, a handle 24 actuating the tube 17 may be folded up as is indicated by dash lines in Fig. 11.

The operation of this apparatus is as follows: When the spoon 16 is brought underneath the hypophyse the boring cylinder 18 is rotatably advanced so that its teeth 19 come to enlarge the inner hole of the orbit. When the boring cylinder 18 is at the end of its stroke (Fig. 12) and has encompassed the hypophyse the spoon 16 is rotated through a half-revolution so as to sever the adherences of the hypophyse gland. The suction piston 21 is then displaced by means of the button 23 so that the gland is retained by suction, whereupon the whole is withdrawn. A reverse action upon the piston 21 permits of conveniently removing the matters picked up.

The operation of the apparatus according to Fig. 13 is similar, except that the rotation of the boring cylinder 18 is effected by means of a motor, through the intermediary of bevel gears 24 confined in a handle 25 that permits of advancing the boring cylinders 18 in the tube 17 and carries a control button with the aid of which the motor may be connected to this handle by means of any suitable flexible transmission.

In the case where the extraction of the glands is to be effected on fixed animals, the boring cylinder may be actuated for example by an electric motor fed from electric mains.

If, in contrast, the apparatus is to travel, a number of stations may be established, having at least one motor fed for example from a storage battery placed on a small carriage.

Finally (Figs. 14 to 18, inclusive) use may be made of special pincers having two shanks one of which is provided with a lower spoon 27 and has an oblong aperture 28 in which may be displaced an axle 29 rigid with the other shank provided with an inverted spoon 31. The spoons 27, 31 are actuated by means of handles 32, 33 rigid therewith. These spoons are outerly serrated to prevent them from slipping. The operation is as follows: The pincers, positioned as shown in Fig. 14, are introduced into the rear hole of the orbit, whereafter they are opened as shown in Fig. 15 so as to enlarge the hole. The spoon 31 is then longitudinally slid over the spoon 27 as shown in Fig. 16. The two spoons are then closed as shown in Fig. 17, containing the hypophyse separated from its ligaments. The whole is then withdrawn.

What is claimed is:

A chirurgical instrument particularly for extracting the hypophysis from the head of a killed animal by trans-orbital approach, said instrument comprising in combination a tubular member, a spoon formed at the forward end of said tubular member and essentially sized to pass through the foramen opticum, cutting edges upon said spoon, means to rotate said tubular member about its longitudinal axis, a cylindrical member adapted to embrace with its open forward end the hypophysis, said cylindrical member mounted in said tubular member for rotational and longitudinal displacement, means to effect such displacement of the cylindrical member, a milling cutter on the forward end of said cylindrical member, a suction piston axially displaceable in said cylindrical member, and means to effect such axial displacement of said suction piston.

References Cited in the file of this patent

UNITED STATES PATENTS

| Number | Name | Date |
|---|---|---|
| 700,185 | Eberts | May 20, 1902 |
| 2,492,158 | Le Compte et al. | Dec. 27, 1949 |

FOREIGN PATENTS

| Number | Country | Date |
|---|---|---|
| 12,239 | Germany | Jan. 14, 1881 |
| 8,984 | Great Britain | July 7, 1900 |
| 39,711 | Norway | Sept. 15, 1924 |
| 409,622 | Great Britain | May 3, 1934 |

OTHER REFERENCES

Seyle, Textbook of Endocrinology, by Acta Endocrinologica, University de Montreal, Montreal, Canada, pages 231 to 234.